United States Patent
Davis

(10) Patent No.: US 6,181,803 B1
(45) Date of Patent: *Jan. 30, 2001

(54) APPARATUS AND METHOD FOR SECURELY PROCESSING BIOMETRIC INFORMATION TO CONTROL ACCESS TO A NODE

(75) Inventor: Derek L. Davis, Phoenix, AZ (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/723,496

(22) Filed: Sep. 30, 1996

(51) Int. Cl.[7] .............. G06K 9/00; H04L 9/00
(52) U.S. Cl. ............................. 382/115; 380/50
(58) Field of Search .................. 382/115, 116, 382/117, 118, 119, 124, 128; 235/380, 381, 382, 383, 384, 385, 386, 382.5, 375, 376, 379; 902/1–13, 22–27, 31–37

(56) References Cited

U.S. PATENT DOCUMENTS

| | | | |
|---|---|---|---|
| 4,215,421 | 7/1980 | Giraud | 364/900 |
| 4,271,482 | 6/1981 | Giraud | 364/900 |
| 4,310,720 | 1/1982 | Check, Jr. | 364/900 |
| 4,544,833 | 10/1985 | Ugon | 235/379 |
| 4,578,531 | 3/1986 | Everhart et al. | 178/22.08 |
| 4,638,120 | 1/1987 | Herve | 178/22.08 |
| 4,656,342 | 4/1987 | Ugon | 235/379 |
| 4,656,474 | 4/1987 | Mollier et al. | 380/23 |
| 4,807,288 | 2/1989 | Ugon et al. | 380/30 |
| 4,811,393 | 3/1989 | Hazard | 380/21 |
| 4,825,052 | 4/1989 | Chemin et al. | 235/380 |
| 4,907,270 | 3/1990 | Hazard | 380/23 |
| 4,907,272 | 3/1990 | Hazard et al. | 380/23 |
| 4,993,068 | 2/1991 | Piosenka et al. | 380/23 |
| 5,005,200 | 4/1991 | Fischer | 380/30 |
| 5,046,092 | 9/1991 | Walker et al. | 380/20 |
| 5,136,646 | 8/1992 | Haber et al. | 380/49 |
| 5,136,647 | 8/1992 | Haber et al. | 380/49 |
| 5,153,581 | 10/1992 | Hazard | 340/825.34 |
| 5,214,702 | 5/1993 | Fischer | 380/30 |
| 5,216,720 | 6/1993 | Naik et al. | 381/43 |
| 5,218,637 | 6/1993 | Angebaud et al. | 380/23 |
| 5,422,953 | 6/1995 | Fischer | 380/23 |
| 5,497,419 | 3/1996 | Hill | 380/9 |
| 5,499,288 | 3/1996 | Hunt et al. | 379/88 |
| 5,539,828 | 7/1996 | Davis | 380/50 |
| 5,546,463 | 8/1996 | Caputo et al. | 380/25 |
| 5,613,012 | * 3/1997 | Hoffman et al. | 382/115 |
| 5,623,539 | 4/1997 | Bassenyemukasa et al. | 379/88 |
| 5,724,425 | 3/1998 | Chang et al. | 380/25 |
| 5,751,809 | 5/1998 | Davis et al. | 380/23 |
| 5,796,840 | 8/1998 | Davis | 380/50 |
| 5,805,712 | 9/1998 | Davis | 380/50 |

* cited by examiner

Primary Examiner—Jose L. Couso
Assistant Examiner—Duy M. Dang
(74) Attorney, Agent, or Firm—Blakely, Sokoloff, Taylor & Zafman LLP

(57) ABSTRACT

A biometric device comprises a biometric processor including a data capture circuit that captures data associated with a predetermined biometric characteristic that is checked to regulate access to the node or area. The biometric processor further includes a cryptographic circuit, coupled to the data capture circuit, that internally processes the data clip which may include comparison of the data clip with pre-stored data being a master copy of the predetermined biometric characteristic of the user. Thereafter, the biometric processor transfers a message to the node to control access thereto.

26 Claims, 4 Drawing Sheets

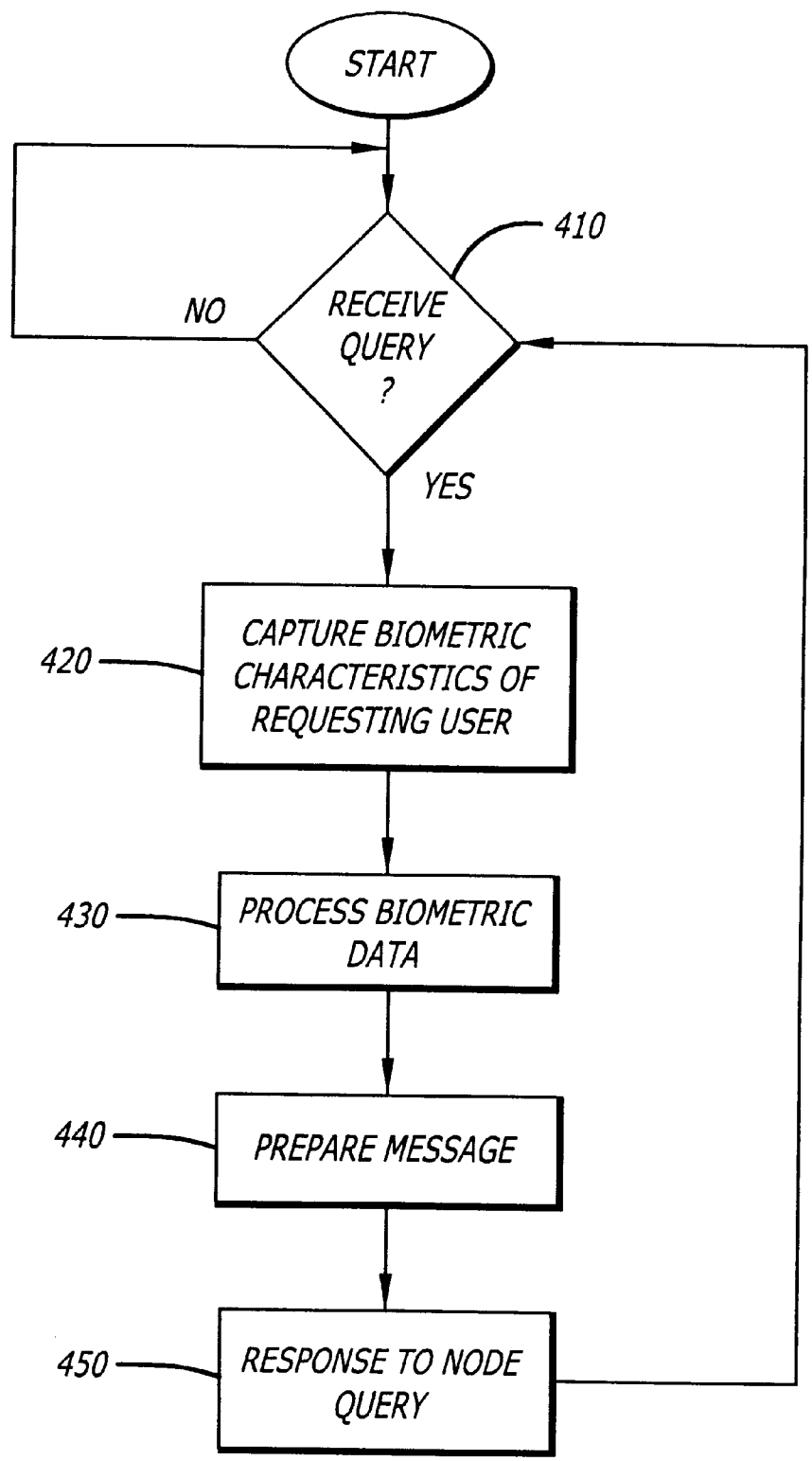

APPARATUS AND METHOD FOR SECURELY PROCESSING BIOMETRIC INFORMATION TO CONTROL ACCESS TO A NODE

CROSS-REFERENCES TO RELATED APPLICATIONS

The named inventor of the present application has filed a number of co-pending United States patents and patent applications including U.S. Pat. No. 5,751,809 entitled "Apparatus and Method for Securing Captured Data Transmitted Between Two Sources" and U.S. patent application Ser. No. 08/678,360 entitled "A System and Method for Digitally Signing a Digital Agreement Between Remotely Located Notes."

BACKGROUND OF THE INVENTION

1. Field of the Invention

The present invention relates to the field of data security. More particularly, the present invention relates to a biometric processor which locally processes biometric information to authenticate an individual before permitting access to a node.

2. Description of Art Related to the Invention

With more and more businesses utilizing personal computers ("PCs"), the importance of data security has increased dramatically. For a data security system to be highly reliable, it must preserve the "integrity" of data transmitted between two PCs as well as control access to one or both of the PCs. One way of controlling access to a PC is by implementing access control systems that utilize biometric devices and operate in accordance with user authentication or user identification techniques (hereinafter referred to separately as "user authentication biometric systems" and "user identification biometric systems", or collectively as "biometric systems").

Currently, there exist many biometric devices that can digitally scan a characteristic of the user (e.g., finger print, iris, retina, facial and hand geometries, etc.) and capture one or more frames of digital data corresponding to that characteristic. The one or more frames of digital data are collectively referred to as a "data clip". Normally, for a user authentication biometric system, its biometric device captures a data clip and transmits the data clip to a computer operating as a database through a signal line in a non-encrypted format. The computer processes the data clip, searches for pre-stored "master" characteristics of the individual requesting access to the node who has previously identified oneself through voice, data input and other input means, compares the data clip to the pre-stored master characteristics, and grants access to a node or an area if certain features of the data clip match those of the pre-stored master characteristics contained in the computer. Otherwise, access is denied. Additionally, the data clip may be stored as an additional security measure.

The user identification biometric systems normally operate in a manner similar to user authentication biometric systems, but are more computationally intensive. The reason is that user identification biometric systems do not rely on any prior identification information by the user to ascertain the user's pre-stored master characteristics for comparison purposes. Instead, the data clip captured by the biometric device is successively compared with each pre-stored characteristics until a match is detected or all of the pre-stored characteristics have been compared to the data clip.

Currently, both biometric systems suffer from a number of disadvantages. One disadvantage is that, in general, a captured data clip transmitted from a biometric device is susceptible to fraudulent alteration if the biometric device is not physically connected to the electronic device processing and/or storing the captured data clip. The reason is that the signal line, situated between a biometric device and the electronic device responsible for the processing the data clip, is publicly accessible. This allows interlopers an opportunity for the captured data clip to be substituted with (i) prior recorded data, (ii) data transferred in real-time from another location or (iii) data combined with non-existent images or characteristics. Assuming that both the biometric device and the associated processing device are themselves physically protected from being tampered with, a solution to this problem is to apply standard cryptographic techniques to the communications between these devices. These techniques may range from creation of a "secure path" where all communications are encrypted to simple authentication of message authenticity where digital signatures or authentication codes are applied to specific messages. Typically, some type of challenge/response methodology will be used to facilitate mutual authentication of the equipment involved.

Another disadvantage is that this functional partitioning of the system requires all captured biometric data to be transmitted over the signal line to the corresponding processing device, potentially creating high static bandwidth requirements for that communication line. For example, a remotely located video camera used for biometric authentication is typically continuously capturing and transmitting data clips (video images) over the dedicated signal line back to a computer operating as a centralized authentication processing center. Obviously, if a bad data clip is captured (e.g. one with bad image quality) is captured, there is no mechanism to preclude that data clip from being processed because conventional biometric devices merely act as a conduit in transferring information to the computer regardless of its quality. As a result, processing time of the computer and bandwidth associated with the signal line are wasted because user authentication or identification is virtually guaranteed to fail when processing a bad data clip.

Therefore, it would be advantageous to develop a biometric system that overcomes the second disadvantage discussed above by localizing the processing of the data clip within the biometric device itself via a biometric processor. This localized processing, if desired, could extend to provide full identification or authentication functions without requiring an additional task being executed by a host processor of the system.

SUMMARY OF THE INVENTION

Based on the foregoing, it is apparent that there exists a need for a biometric device that regulates access to a node or restricted area. The biometric device comprises a biometric processor including a data capture circuit that captures data associated with a predetermined biometric characteristic and a processing unit that processes the captured data before transmitting information through a cryptographic circuit to the node to control access thereto.

BRIEF DESCRIPTION OF THE DRAWINGS

The features and advantages of the present invention will become apparent from the following detailed description of the present invention in which:

FIG. 4 is an illustrative flowchart of the operations of the biometric device implemented with the biometric processor of FIG. 2 to control access to a node.

DESCRIPTION OF THE PREFERRED EMBODIMENT

The present invention relates to a biometric processor that locally processes biometric information to authenticate an individual before allowing him or her access to a node as well as its corresponding method of operation. In the following description, some terminology is used to discuss certain well-known cryptographic functions. For example, a "data clip" is information digitized into binary data acquired for user authentication or identification. A "message" is digital information transmitted from a source to a destination. A "key" is an encoding and/or decoding parameter used by conventional cryptographic algorithms such as Rivest, Shamir and Adleman ("RSA"), Data Encryption Algorithm ("DEA") as specified in Data Encryption Standard ("DES") and the like. A "certificate" is defined as any digital information (typically a public key) associated with an entity, encrypted by a private key held by another entity such as a manufacturer or a widely published trusted authority (e.g., bank, governmental entity, trade association, etc.). A "digital signature" is similar to a certificate but is typically used for authenticating data. Herein, the term "secure" indicates that it is computationally infeasible for an interloper to successfully perpetuate fraud on a biometric system.

Figure 1:
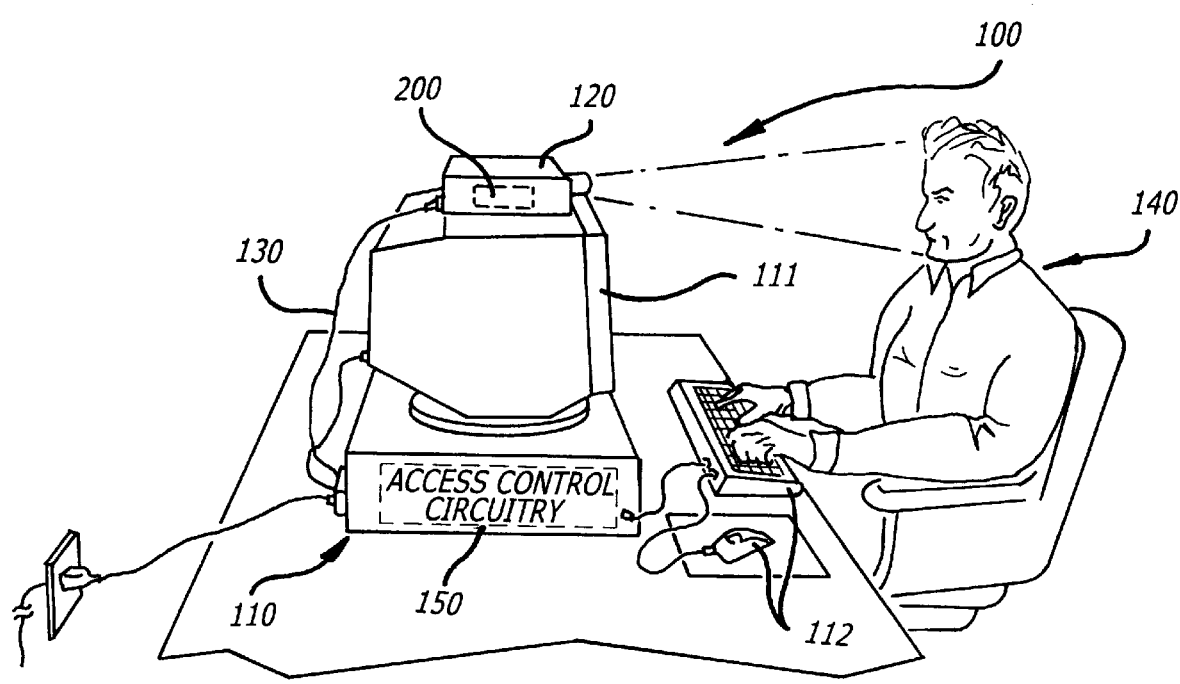
FIG. 1 is an illustrative block diagram of a biometric system regulating access to a computer system through a secure biometric device.

Referring to FIG. 1, an illustrative embodiment of a biometric system 100 regulating access to a node 110 through a biometric device 120 is illustrated. The node 110 may include an electronic device capable of processing data and reserved for use by a particular individual or groups of individuals. The node 110 may include, but is not limited to, a computer, air traffic control equipment, a banking system (e.g., an automated teller machine, vault, etc.). For illustrative purposes, the node 110 is portrayed as a personal computer ("PC"). However, a node may be construed as a physical area described in FIG. 5.

As shown, the PC 110 includes a display monitor 111 and at least one input device 112. The input device 112 may include an alphanumeric keyboard, cursor control device, or any other electronic device that can input information to the PC such as a numeric pad or card reading device. A biometric device 120 (e.g., a biometric scanner of facial or hand geometries, iris patterns, voice synthesizer) is preferably positioned separate from the display monitor 111 as shown and interconnected to the PC 110 through a communication line 130. It is contemplated, however, that the biometric device 120 may be implemented internally within the casing of the display monitor 111, the casing of the PC 110, positioned on the input device 112 and the like.

The biometric device 120 includes an input source (e.g., lens, scanner, microphone, etc.) that routes data to a biometric processor 200 having cryptographic functionality contained within the biometric device 120. The biometric processor 200 captures a data clip of desired data (e.g., facial geometries or other characteristics of a user 140 requesting access to the node). The biometric processor 200 further processes the data clip locally therein before sending at least one "secure" message to the PC 110 to remain accessible or shut-down. Security of the message is assured through the use of standard cryptographic techniques such as encryption, digital signatures, digital certificates, etc. These techniques are well known to those skilled in the art, and thus, do not warrant further description herein. The PC 110 may be shut-down by any conventional manner such as, for example, disabling (i) the host processor or any critical element contained in the PC 110, or (ii) circuitry controlling power distribution within the PC 110. Preferably, as shown, the biometric device 120 should be unobtrusive to the requesting user 140 by not requiring active participation by the user. This unobtrusive nature permits continuous capture of the user's characteristics while still avoiding any interference with his or her productivity.

As illustrated by dashed lines in FIG. 1, access control circuitry 150 is implemented within the PC 110 to initiate periodic queries to the biometric processor 200, typically after start-up of the PC 110. The access control circuitry 150 is used to disable the PC 110 if the response to the query is incorrect or no response is made within a prescribed period of time. While shown for illustrative purposes as a specialized circuit, the function of the access control circuitry 150 may be alternatively performed by software executing on the host processor or within other elements in PC 110. The operations of the access control circuitry 150 are described below in FIG. 3.

Figure 2:
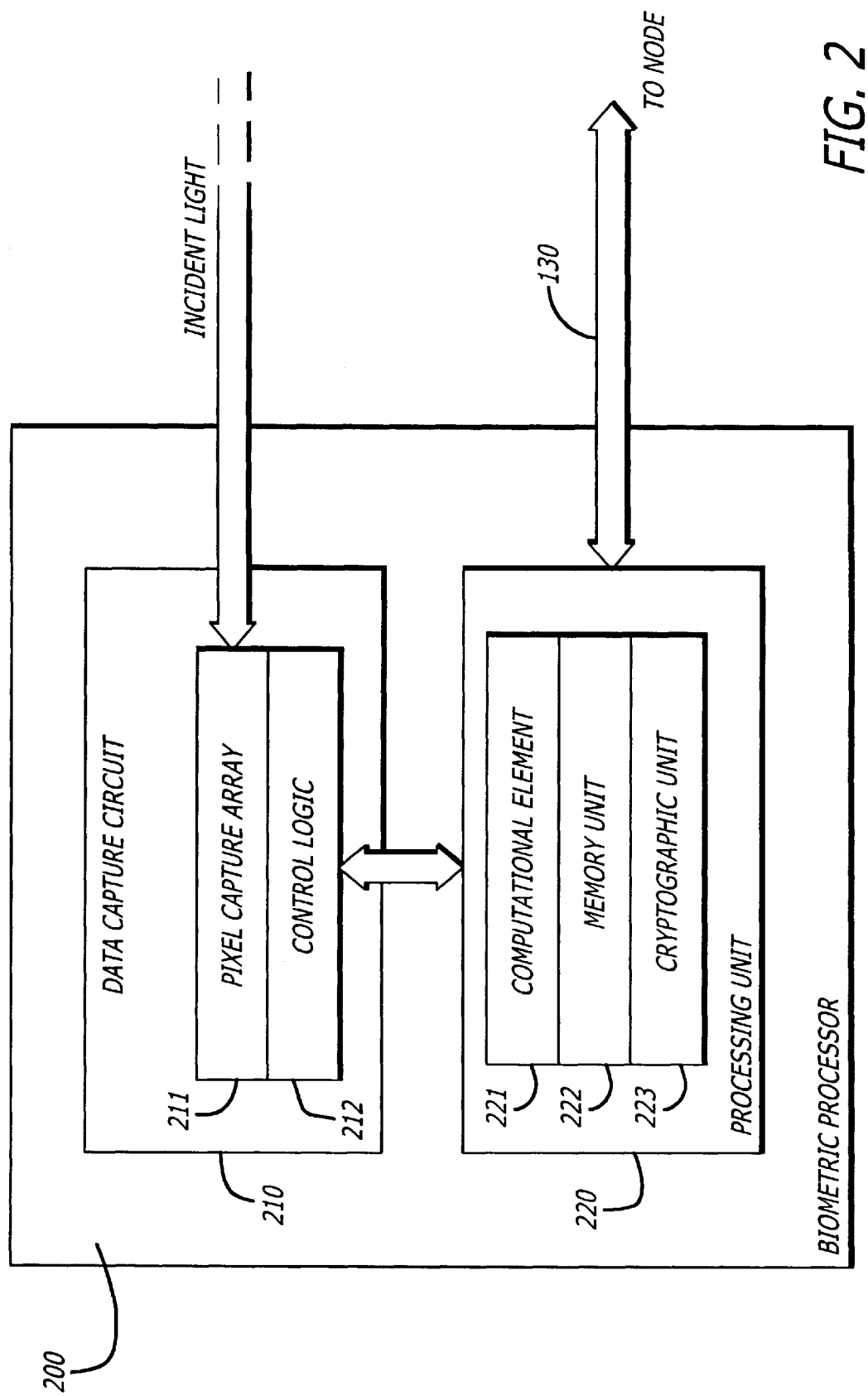
FIG. 2 is a block diagram of an embodiment of the biometric processor of FIG. 1.

Referring now to FIG. 2, one embodiment of the biometric processor 200 is shown. The biometric processor 200 comprises a data capture circuit 210 and a processing unit 220, both of which are preferably integrated into one integrated circuit package to reduce vulnerability to physical tampering. However, it is contemplated that these circuits 210 and 220 may be implemented in a multi-chip package or in separate packages, provided a less secure environment is acceptable.

When comparison of visual biometric characteristics are used, the data capture circuit 210 includes a conventional sensor such as, for example, a Charge Coupled Device "CCD" (the standard sensor used in camcorders), a video sensor developed by VLSI Vision Limited, Inc. of Edinburgh, Scotland. It is contemplated that other types of sensors or technology may be used in order to capture a data clip associated with a selected biometric characteristic of an access-requesting user, for example when the biometric data is audio in nature. For the sake of clarity, the selected biometric characteristics will be described as visual physical characteristics (e.g., iris patterns, retina patters, finger prints, facial geometries, etc.), while it is contemplated that non-visual characteristics of the user (e.g., voice patterns, data entry patterns, etc.) may be used for authentication or identification purposes.

As shown, the data capture circuit 210 includes a pixel capture array 211 and control logic 212 controlling the pixel capture array 211. The control logic 212 digitizes biometric characteristics of the user and transmits the digitized version of the biometric characteristic to the processing unit 220.

The processing unit 220 comprises at least a computational element 221, a memory unit 222, and an optional cryptographic unit 223, all of which may be coupled together through a standard bus architecture. Cryptographic operations required to provide secure communications with the node though communication line 130 are either performed by cryptographic unit 223 or by firmware executing on the computational element 221. The computational element 221, which may be a microprocessor, microcontroller or any other electronic component(s) having processing capabilities, executes at least one computational process (e.g., comparison, transformation, etc.) on the acquired biometric data.

It is contemplated that processing performed by the processing unit 220 on the acquired biometric data clip received from the data capture circuit 210 may include, but not be limited to, the creation of a composite data clip having better image resolution quality by computationally extrapolating information from multiple samples (e.g., a number of successive data clips). This creation of the composite data clip would be useful where the biometric device includes a relatively low resolution camera that successively captures data clips associated with selected characteristic(s) of the user.

Another example of processing operations may involve the cropping of a data clip so that certain characteristics relevant to authentication or identification operations are identified and retained while characteristics unnecessary for comparison purposes are excluded. This may further reduce bandwidth usage and increase the processing speed of the biometric system.

Ultimately, the processing performed by the processing unit 220 may extend to include the actual comparison of pre-stored master characteristics with the processed data clip to determine whether or not to grant the user access to the node.

Referring still to FIG. 2, the memory element 222 is used for storage of intermediate computational results and may optionally be used to store master characteristics, depending on whether comparisons are being performed by the processing unit 220 or by the host processor contained within the node. If the comparisons are being performed by the processing unit 220, the memory element 222 is modifiable to contain such master characteristics that can be updated. For example, the memory unit 222 may be adapted with all types of memory including, but not limited to Random Access Memory ("RAM"), Electrically Erasable Programmable Read-Only Memory "EEPROM" and other types of Flash memory. It is contemplated that the master characteristics may be updated by transmitting the information from the node through the secure communication line 130. Furthermore, the node may communicate with a remotely located source (e.g., a centralized database) to receive master characteristics of the user downloaded from the remotely located source. The memory unit 222 may also be used to store such cryptographic keying material and digital certificates as may be required to implement the security functions associated with providing secure communications to the node.

The access control circuitry (see FIG. 1) periodically queries the biometric processor 200 to transmit a "response" message from the biometric device to the node via the communication line 130. The response message signals that access to the node is still authorized or provides data necessary to determine whether such access is authorized.

If the access control circuitry does not receive a response message after a prescribed time period has elapsed, it disables further user access to the node. The periodicity of the prescribed time period may be static or dynamic. If dynamic, the time period may be modified depending on the preferred security at the node. For example, if the node is a PC, the periodicity may be more frequent than that for a vehicle.

Figure 3:
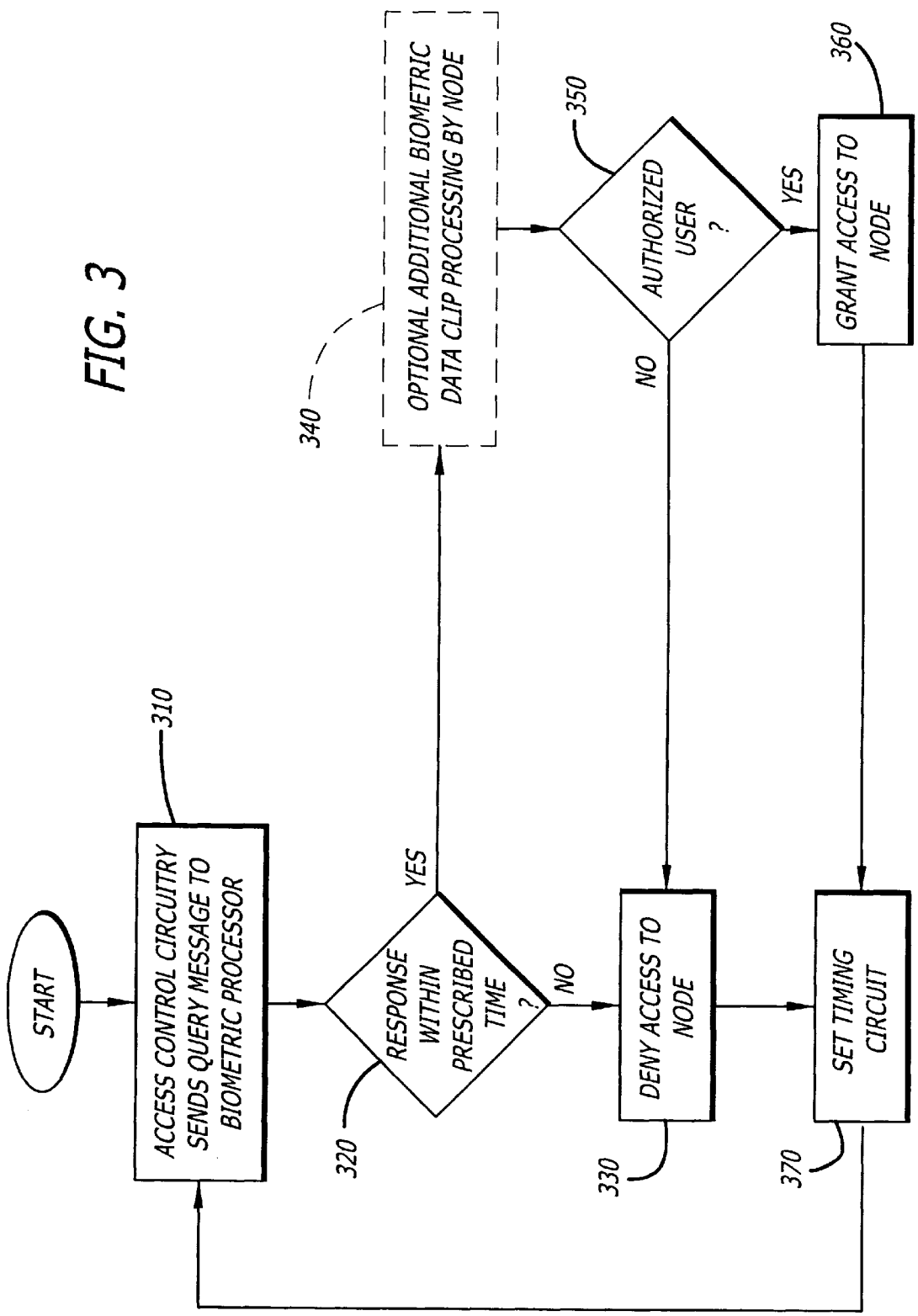
FIG. 3 is an illustrative flowchart of the operations of the access control circuitry employed in the node of FIG. 1 in order to control access to that node.

Referring now to FIG. 3, the operational steps performed by the access control circuitry operating in tandem with the biometric processor to authenticate or identify a requesting user of the node is shown. In Step 310, either continuously on a periodic basis or triggered by some action of the requesting user (e.g., depressing a key, flipping a switch, etc.), the access control circuitry queries the biometric device by transmitting a message to the biometric processor and awaits a response before expiration of the prescribed time period. Thereafter, one of two operational procedures may occur, depending on whether the biometric device responds within the predetermined time period (Step 320).

If the biometric device does not respond within the required time, access to the node is denied to the requesting user (Step 330). The access control circuitry then proceeds to reset a timing circuit (Step 370) as described below.

If a response is received from the biometric device within the required time period, optional processing of the biometric data clip may be completed by the node represented by dashed lines in Step 340. This may include additional resolution enhancement, feature extraction, etc. If all biometric processing, including comparison to master characteristics, is performed within the biometric device, optional processing is not required. In Step 350, the results of the biometric processing are used to determine whether the requesting user should have access to the node. This may be as simple as acting on a "yes/no" response from the biometric device. Based on this determination, the requesting user is either granted access to the node (Step 360) or denied access to the node (Step 330).

After disabling the node or refraining from such disablement, the timing circuit within the node is reset so that the access control circuitry performs another query within a prescribed period of time (Step 370). As suggested previously, the timing circuit may be static in nature or dynamic, allowing the requesting user or other authorized entity (e.g. a corporate enterprise Information Systems Manager) to adjust the periodicity of successive queries. However, these may be imposed limitations on the degree of adjustment to avoid circumventing the authentication procedure.

Referring now to FIG. 4, the operational steps performed by the biometric processor in authenticating and/or identifying the user who desires access to the node are illustrated. First, since the biometric device and access control circuitry have been in previous operation, access to the node has been disabled when no authorized user is proximate to the node. In the absence of a requesting user, the biometric device typically remains idle as shown in Step 410, waiting for a query from the access control circuity. As previously described in FIG. 3, when a requesting-user approaches the node and requests usage of that node by any selected request mechanism (e.g., depressing a key of a numeric pad or alphanumeric keyboard, speaking into a voice synthesizer, presenting a physical characteristic, etc.), the access control circuitry generates a query to the biometric device. In response to this request, the biometric device begins to capture a selected characteristic of the user (Step 420). Subsequently, the biometric device begins processing the digital data associated with the selected characteristic (Step 430). Such processing may include creating a data clip narrowly tailored to a more specific biometric characteristic than received as input (e.g., a finger print from a scanned hand pattern), creating a composite data clip having better image resolution quality through extrapolation of information from multiple samples, spacial rotation of the data clip, cropping the data clip, retrieving master characteristics based on user identification from a centralized source, and/or comparing biometric characteristics of the requesting user to the master characteristics.

Next, as shown in Step 440, the biometric processor prepares a response message including the processed digital data along with any other data as needed. The biometric processor then transmits the response message to the node (Step 450). Thereafter, the capturing of biometric characteristics in response to further periodic queries from the node continues to ensure that the requesting user is still using the node.

Figure 5:
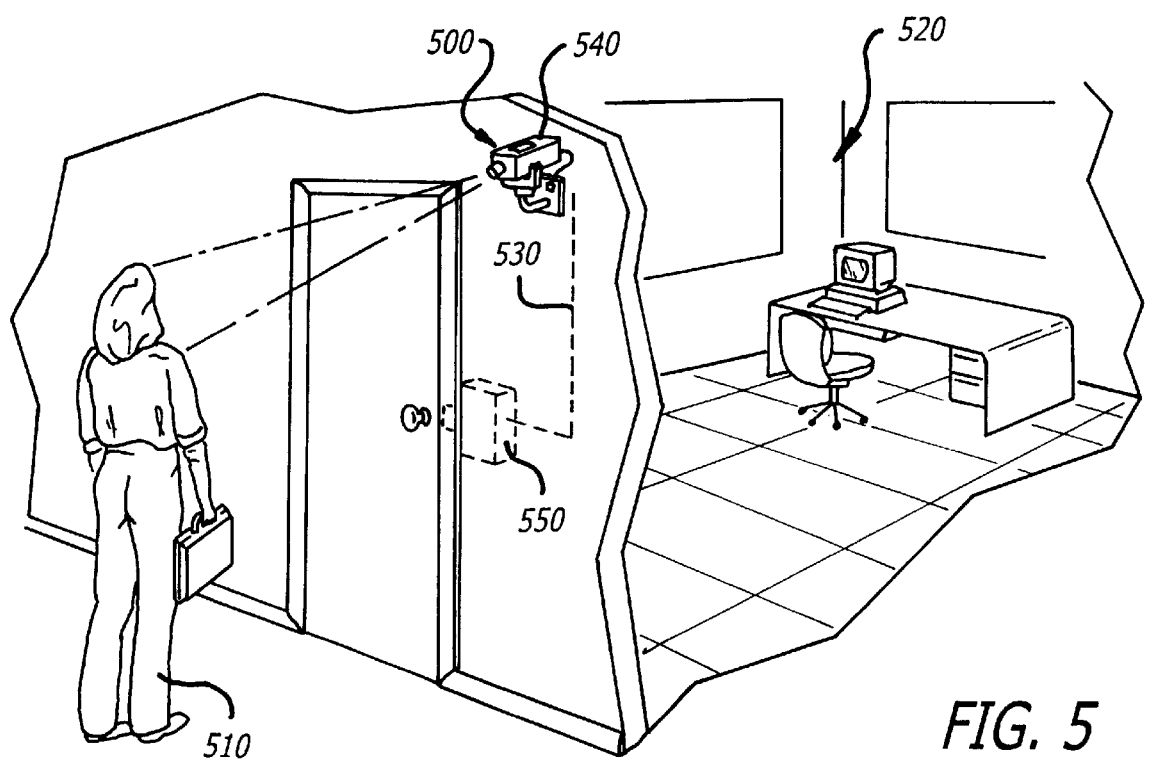
FIG. 5 is an illustrative perspective view of another embodiment of the present invention.

Referring to FIG. 5, another embodiment of the secure biometric device for use in home or business security is illustrated. Similar to that shown in FIG. 1, the secure biometric device 500 prevents access by an unauthorized user 510, however, this access is not to the contents or control features of electronic equipment, but rather access to a security area or dwelling space 520. Conventionally, it is clear that a communication line 530 between a standard video camera 540 and a lock control mechanism 550 for the door is unsecure allowing a person to transmit incorrect information to the lock control mechanism 550 by simply disconnecting the communication line 530 and interconnecting another communication line thereto.

With respect to the present invention, processing is performed within the secure biometric device (e.g., the video camera 540) through implementation of the biometric processor of FIG. 2 for example. This would preclude fraudulent video from being transferred to the lock control mechanism 550 to cause it to mistakenly believe that an authorized user is waiting access to the security area or dwelling space.

What is claimed is:

1. A biometric device for controlling access to a node comprising:
   a semiconductor package;
   a biometric processor placed in the semiconductor package, the biometric processor including
      a data capture circuit contained in the semiconductor package, the data capture circuit to capture a plurality of successive clips of data associated with predetermined biometric characteristic, and
      a processing unit coupled to the data capture circuit and contained in the semiconductor package, the processing unit to extrapolate information from at least two data clips of the plurality of successive data clips to produce a composite data clip and compare the composite data clip with a clip of pre-stored data being a master copy of the predetermined biometric characteristic; and
   an input source placed outside the semiconductor package, the input source to receive data associated with the predetermined biometric characteristic.

2. The biometric device according to claim 1, wherein the semiconductor package includes an integrated circuit package.

3. The biometric device according to claim 1, wherein the semiconductor package includes a multi-chip package.

4. The biometric device according to claim 3, wherein the data capture circuit includes a pixel capture array to receive and store the data and a control logic circuit to transfer the plurality of successive data clips to the processing unit.

5. The biometric device according to claim 1, wherein the processing unit includes
   a computational element that internally processes the plurality of successive data clips; and
   a memory unit coupled to the computational element, the memory unit contains the clip of pre-stored data being the master copy of the predetermined biometric characteristic.

6. The biometric device according to claim 5, wherein the processing unit further includes a cryptographic unit coupled to at least the computational element.

7. The biometric device according to claim 6, wherein the computational element being one of a microprocessor and a microcontroller.

8. The biometric device according to claim 6, wherein key information used by the cryptographic unit is contained in the memory unit.

9. The biometric device according to claim 1, wherein the composite data clip has a better resolution than any one of the at least two data clips.

10. The biometric device of claim 1, wherein the input source includes a lens of a camera.

11. The biometric device of claim 1, wherein the input source includes a scanner.

12. The biometric device of claim 1, wherein the input source includes a microphone.

13. The biometric device of claim 1, wherein the data capture circuit includes a charge coupled device.

14. The biometric device of claim 1, wherein a computational element of the processing unit of the biometric processor provides digital data to the node.

15. A biometric device regulating access to a node, comprising:
   input means for routing data associated with a predetermined biometric characteristic to be captured; and
   cryptographic means for controlling access to the node, the cryptographic means being a semiconductor device that includes
      capture means for capturing a plurality of successive data clips of the data associated with the predetermined biometric characteristic at a periodic rate,
      processor means for internally producing a composite data clip extrapolating information from at least two data clips of the plurality of successive data clips, comparing the composite data clip with a clip of pre-stored data being a master copy of the predetermined biometric characteristic, and transferring a message to the node to control access thereto, the processor means being coupled to the capture means, and
   circuitry packaging means for reducing a risk of physical tampering with the cryptographic means by encapsulating at least the capture means.

16. The biometric device according to claim 15, wherein the processor means further encrypts the message before transfer to the node.

17. A computer comprising:
   access control circuitry to control user access to the computer; and
   a biometric device in communication with the access control circuitry to respond to periodic messages from the access control circuitry, the biometric device including
      a semiconductor package,
      a data capture circuit placed in the semiconductor package, the data capture circuit to capture a plurality of successive data clips of a predetermined biometric characteristic, and
      a processor coupled to the data capture circuit and placed in the semiconductor package, the processor including
         a memory unit to contain a clip of pre-stored data being a master copy of the predetermined biometric characteristic, and
         a computational element to extrapolate information from at least two data clips of the plurality of successive data clips to produce a composite data clip to compare the composite data clip with the clip of pre-stored data, and to provide a signal whether a match has been detected.

18. The biometric system of claim 17, wherein the computational element includes a microprocessor.

19. The computer of claim 17, wherein the access control circuitry denies access to the computer if the biometric device fails to respond a message from the access control circuitry within a prescribed period of time.

20. The computer of claim 19 wherein the periodicity of the messages is dynamic in nature.

21. The computer of claim 17, wherein the semiconductor package of the biometric device includes a single integrated circuit package.

22. The computer of claim 17, wherein the semiconductor package of the biometric device includes a multi-chip package.

23. Implemented within a semiconductor package, a biometric processor comprising:

a data capture circuit placed in the semiconductor package, the data capture circuit to capture a plurality of successive clips of data associated with a predetermined biometric characteristic; and a processing unit coupled to the data capture circuit and placed in the semiconductor package, the processing unit extrapolating information from at least two data clips of the plurality of successive data clips to produce a composite data clip and comparing the composite data clip with a clip of pre-stored data being a master copy of the predetermined biometric characteristic.

24. The biometric processor of claim 23, wherein the composite data clip having a better resolution than any one of the at least two data clips.

25. The biometric processor of claim 23, wherein the semiconductor package includes a single integrated circuit package.

26. The biometric processor of claim 23, wherein the semiconductor package includes a multi-chip package.

* * * * *